(12) United States Patent
Ha (10) Patent No.: US 6,434,127 B1
(45) Date of Patent: Aug. 13, 2002

(54) METHOD AND APPARATUS FOR IMPLEMENTING ANSI TCAP IN MOBILE COMMUNICATION NETWORK SYSTEM

(75) Inventor: Gap-Soo Ha, Kumi (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/283,244

(22) Filed: Apr. 1, 1999

(30) Foreign Application Priority Data

Apr. 1, 1998 (KR) ........................................ 1998-11415

(51) Int. Cl.[7] ................................................ H04Q 7/00
(52) U.S. Cl. ........................ 370/328; 370/467; 370/522
(58) Field of Search ................................. 370/328, 338, 370/349, 410, 464–467, 469, 522, 524; 379/221.08, 221.09, 221.1, 221.12, 229–231; 455/432, 435, 445, 461, 466, 560

(56) References Cited

U.S. PATENT DOCUMENTS

| | | |
|---|---|---|
| 5,084,870 A | 1/1992 | Hutchinson et al. |
| 5,420,916 A | 5/1995 | Sekiguchi |
| 5,617,418 A | 4/1997 | Shirani et al. |
| 5,708,657 A | 1/1998 | Hong |
| 5,802,058 A | 9/1998 | Harris et al. |
| 5,847,752 A | 12/1998 | Sebestyen |
| 5,852,660 A | 12/1998 | Lindquist et al. |
| 5,864,761 A * | 1/1999 | Choi |
| 6,011,803 A * | 1/2000 | Bicknell et al. |
| 6,341,162 B1 * | 1/2002 | Kelly et al. |

* cited by examiner

Primary Examiner—Melvin Marcelo
Assistant Examiner—Inder Pal Mehra
(74) Attorney, Agent, or Firm—Robert E. Bushnell, Esq.

(57) ABSTRACT

A method for processing a service and protocol without changing a protocol even though a mobile network service type is changed while a mobile network system implements a service using an International Telecommunication Union-Telecommunication Standardization Section Transaction Capabilities Application Part (ITU-T TCAP) or an American National Standards Institute Transaction Capabilities Application Part (ANSI TCAP). The method includes the steps of: checking whether there is a primitive according to a component type upon receiving a primitive from a transaction component (TC) user; if there is a primitive according to the component type, re-constructing a primitive according to the component type; generating a procedure for processing the re-constructed primitive according to a package type, and constructing a primitive to be transmitted to a signal connection control part (SCCP) according to the package type by adding the re-constructed primitive to a component part; checking whether there is a protocol error upon receiving a primitive from the signal connection control part (SCCP); if there is no protocol error and the received primitive is the first primitive generated from the other station, assigning a transaction identification (ID) and recording a receiving status in a corresponding transaction identification (ID) table; and transmitting the received primitive to the transaction component (TC) user.

18 Claims, 5 Drawing Sheets

METHOD AND APPARATUS FOR IMPLEMENTING ANSI TCAP IN MOBILE COMMUNICATION NETWORK SYSTEM

CLAIM OF PRIORITY

This application makes reference to, incorporates the same herein, and claims all benefits accruing under 35 U.S.C. §119 from my application METHOD AND APPARATUS FOR IMPLEMENTING ANSI TCAP IN MOBILE COMMUNICATION NETWORK SYSTEM filed with the Korean Industrial Property Office on Apr. 1, 1998 and there duly assigned Serial No. 98-11415 by that Office.

BACKGROUND OF THE INVENTION

1. Field of the Invention

The present invention relates to a method for processing a service and protocol without changing a protocol even though a mobile network service type is changed while a mobile network system implements a service using an International Telecommunication Union-Telecommunication Standardization Section Transaction Capabilities Application Part (ITU-T TCAP) or an American National Standards Institute Transaction Capabilities Application Part (ANSI TCAP).

2. Description of the Related Art

In general, an electronic service switching system manages a link identification by assigning a dialog identification to an application service element (ASE) and a transaction capabilities application part (TCAP) in number 7 (No.7) signaling.

Structures of intelligent network service controllers of number 7 (No.7) signaling use an International Telecommunication Union- Telecommunication Standardization Section Transaction Capabilities Application Part (ITU-T TCAP) and an American National Standards Institute Transaction Capabilities Application Part (ANSI TCAP), respectively. The intelligent network service controller includes an application service (ASE). The protocol processor has a transaction capabilities application part (TCAP), a signal connection control part (SCCP) and a message transfer part (MTP). The application service element (ASE) generates a corresponding operation by an operation execution request from an application processor and transmits the generated operation to the other application service element (ASE) through the transaction capabilities application part (TCAP).

The transaction capabilities application part (TCAP) includes a main processor for managing its position and a transaction identification (ID) table. The transaction capabilities application part (TCAP) is divided into a component sublayer and a transaction sublayer. The component sublayer transmits a component between specific application service elements (ASEs). The transaction sublayer provides a dialog function for transmitting a transaction message.

Upon receiving a dialog primitive from a dialog execution block of the application service element (ASE), a dialog part receives a component corresponding to the received dialog from a component part and forms a transaction primitive to be transmitted to a transaction processor. Upon receiving the transaction primitive, the transaction processor forms a dialog primitive to be transmitted to the dialog part and transmits a component to the component part.

Upon receiving a component primitive from an operation execution block of the application service element (ASE), the component part codes a component which is received according to a dialog type and stores the component. Further, the component part transmits a component to the dialog part in response to a request from the dialog part and discards a corresponding component in response to a dialog end message from the dialog part. Upon receiving a component from the dialog part, the component part checks if the component has an error and forms a component primitive according to the checked result and a component type to transmit the component primitive to the application service element (ASE).

Upon receiving the transaction primitive from the dialog part, the transaction processor forms a transaction message to be transmitted to the signal connection control part (SCCP). Upon receiving a transaction message from the signal connection control part (SCCP), the transaction processor checks if the transaction message has an error and forms a transaction primitive according to the checked result and a component type to transmit the transaction primitive to the dialog part. The signal connection control part (SCCP) processes a protocol of number 7 (No.7) common line signaling by using a service of the message transfer part (MTP). Also, the message transfer part (MTP) transmits and receives a protocol signal through a number 7 (No.7) link between a service switching point (SSP) and a service control point (SCP).

In the above description, a primitive designates a function message for processing an interface between an adjacent two layers. A component indicates an exchanged protocol data unit. A dialog primitive is a message for processing an interface between the application service element (ASE) and the dialog part. A component primitive is a message for processing an interface between the application service element (ASE) and the component part. A transaction primitive is a message for processing an interface between the dialog part and the transaction processor.

In the switching system for an intelligent network service, a call processing part and a protocol processing part differ according to a service type. That is, there are International Telecommunication Union-Telecommunication Standardization Section Transaction Capabilities Application Part (ITU-T TCAP) proposed by International Telecommunication Union-Telecommunication Standardization Section (ITU-T) and an American National Standards Institute Transaction Capabilities Application Part (ANSI TCAP) used in the United States. In code division multiple access (CDMA), the International Telecommunication Union-Telecommunication Standardization Section (ITU-T TCAP) is used to provide an operation service related to a mobile network. In a mobile communication network using a service and protocol of the American National Standards Institute Transaction Capabilities Application Part (ANSI TCAP), a message transfer part (MTP) of level 3 operates a procedure for converting an International Telecommunication Union-Telecommunication Standardization Section (ITU-T) protocol into an American National Standards Institute (ANSI) protocol to transmit the American National Standards Institute (ANSI) protocol to the other station. During a receiving operation, the message transfer part (MTP) converts the American National Standards Institute (ANSI) protocol into International Telecommunication Union-Telecommunication Standardization Section (ITU-T) protocol to transmit the International Telecommunication Union-Telecommunication Standardization Section (ITU-T) protocol to an upper layer.

As described above, if a mobile network service type is changed to a service and protocol using the American National Standards Institute Transaction Capabilities Application Part (ANSI TCAP) while a mobile communication network system implements an operation related to a mobile network by using a service and protocol of an International Telecommunication Union-Telecommunication Standardization Section Transaction Capabilities Application Part (ITU-T TCAP), the message transfer part (MTP) converts a protocol to perform an operation with the other station. Therefore, the real-time processing performance of the message transfer part (MTP) can be degraded and the capacity capability of a signal terminal which can be connected to the other station can be lowered.

U.S. Pat. No. 5,084,870 to Hutchison et al., entitled NETWORK TOPOLOGY CONTROL METHOD AND APPARATUS, discloses a method and apparatus for detecting invalid network topologies in a local area network (LAN). The stations comprising the LAN are disclosed to include single attachment stations (SAS), dual attachment stations (DAS), wire concentrators (WC), and DAS/WC combination stations. The adjacent stations exchange connection type information identifying a type of physical connection of the station sending the connection information. It is disclosed that the station receiving the connection information determines whether the connection is valid for its physical connection type using a connection matrix. Invalid connections it is disclosed, can result a network topology where stations are physically connected, but are not logically connected because the stations do not all form a primary ring. It is disclosed that the invalid connections can be rejected and bypassed in each station. Alternately, a station detecting an invalid connection may reconfigure itself using an internal data switch. It is disclosed the actions of each station taken together, achieve a globally designated primary ring.

U.S. Pat. No. 5,420,916 to Sekiguchi, entitled SIGNALING NETWORK HAVING COMMON SIGNALING NODE FOR PROTOCOL CONVERSION, discloses that a common channel signaling network comprises a first and a second subnetwork each being composed of interconnected signaling nodes having a service entity. It is disclosed that the first and second subnetworks employ different versions of protocol for message transmission. A common signaling node is provided for protocol conversion. It is disclosed that as the common signaling node receives a message from a service entity of each subnetwork, it converts the message format to the protocol of the other subnetwork, and transmits it to a service entity of the other subnetwork.

U.S. Pat. No. 5,617,418 to Shirani, et al., entitled NETWORK LINK DETECTION AND GENERATION, discloses a support for a mixed network environment that is provided, which can contain multiple isochronous and/or non-isochronous LAN protocols such as Isochronous-Ethernet, Ethernet, isochronous token ring, token ring, other isochronous-LAN or other LAN systems. It is disclosed that a support for mixed environment includes a protocol detection mechanism which is embodied in a handshaking scheme. This handshaking scheme, as it is disclosed, determines the signaling capability at the end points of the link and implements the correct protocol. This enables isochronous nodes and hubs to automatically detect the presence of Ethernet, token ring, or other LAN equipment at the other end of the network cable. If this detection occurs, the isochronous LAN equipment will fall-back to a LAN compliant mode of operation. It is disclosed that only the hub will have the capability of operating in different networking modes, such as Ethernet and Token Ring isochronous modes. The hub will listen for some form of identification from the attached nodes as to the type of service to provide—isochronous or non-isochronous; Ethernet, token ring or other LAN service.

U.S. Pat. No. 5,708,657 to Hong, et al. entitled an APPARATUS FOR INTERFACING MOBILE SWITCHING CENTER (MSC) WITH BASE STATION CONTROLLER (BSC) OF CDMA MOBILE SYSTEM. It discloses that a base station controller interface of the code division multiple access (CDMA) mobile system is described for interfacing between the base station controller and the CDMA mobile switching center (MSC) of the CDMA mobile system (CMS). It is disclosed that the base station controller decreases the load of the system by including, for every base station controller interface, the mobile announcement (MANM) to service the state information of the subscriber of interest for all paging to the mobile subscriber. At the same time, it disclosed that the connection between the base station controller and the base station controller interface of the mobile switching center utilizes the EL 2048 Kbps interfacing technique applying the conventional communication network recommended in the International Telecommunication Union-Telecommunication Standardization Section (ITU-T). The transmission of the message and the call traffic using the interfacing technique is performed to be linked with the TSB of the base station controller. It is disclosed that the control signal for processing the call is accomplished by using the inner communication message protocol which is connected in the EIA-422 interfacing mode to the call control processor of the base station controller. Therefore, the call processing function to the mobile subscriber, the mobility management function, the mobile subscriber announceable function, and the itself operational preservative function can be performed.

U.S. Pat. No. 5,802,058 to Harris, et al entitled a NETWORK-INDEPENDENT CONNECTION MANAGEMENT discloses a telecommunication system that comprises communications endpoints, communications resources, a communications server that includes a media manager and a network that interconnects them all, a first endpoint that provides the media manager with an offer of a connection to a second endpoint that specifies attributes desired for the connection by the first endpoint. The media manager registers the request and forwards it to the second endpoint. It is disclosed that when the second endpoint responds with an acceptance of the connection that specifies attributes desired for the connection by the second endpoint, the media manager compares the registered offer with the received acceptance to determine any resources that are needed to bridge any differences between their attributes and to effect the connection. It is disclosed the media manager then marshals any needed resources for the connection, sends a modified acceptance to any marshaled resource telling it the address of the second endpoint to connect to, sends a modified acceptance to the first endpoint that tells it the address of any marshaled resource, or of the second endpoint in the absence of any marshaled resource, to connect to, and leaves it up to the endpoints and marshaled resources to interact with the network to effect the connection through the network. The media manager can therefore provide centralized call control for substantially any network, and can treat all networks generically and leave it up to the endpoints to deal with the particulars of any specific network. It is further disclosed communications between multiple such telecommunications systems can also be effected thereby.

U.S. Pat. No. 5,847,752 to Sebestyen, entitled METHOD FOR CALL SETUP AND CONTROL OF VIDEOTELEPHONE COMMUNICATION discloses a method and arrangement for connection setup and control of digitally compressed audio, video and data signals between videotelephones of the analog and digital communication networks (for example, telephone network, mobile telecommunication) and a method and arrangement for the transmission of still pictures and/or between videotelephones of the same category. It is disclosed in videotelephony, a bidirectional full-duplex information exchange is fundamentally assumed in both directions, that is, both communicating videotelephone terminal equipment are usually transmitter and receiver of audio, video, control and, potentially, other information at the same time. It is disclosed the method for connection setup between videotelephone communication terminal equipment in a transmission network using a protected transmission protocol in a framework of International Telecommunication Union-Telecommunication Standardization Section (ITU-T) V.8 initialization and of an International Telecommunication Union-Telecommunication Standardization Section (ITU-T) V.34 modem, has the steps of: supporting videotelephone communication within the framework of the International Telecommunication Union-Telecommunication Standardization Section (ITU-T) V.8 initialization in that at least a request for high transmission quality for videotelephone communication is signaled to the network during connection setup between a calling terminal equipment and, a called terminal equipment; and recognizing in the calling terminal equipment a type of the called terminal equipment and a type of the transmission network connected thereto.

U.S. Pat. No. 5,852,660 to Lindquist, et al. entitled NETWORK PROTOCOL CONVERSION MODULE WITHIN A TELECOMMUNICATIONS SYSTEM, discloses that Signaling Connection Control Part (SCCP) parameters within a signal generated within a first SS7 telecommunications network are converted into values and formats acceptable by a second SS7 telecommunication network by a converter residing within a gateway Signal Transfer Point (STP). It is disclosed such a converter enables signals containing application layer data to be transported across two different SS7 telecommunications networks that are otherwise incompatible.

SUMMARY OF THE INVENTION

It is an object of the present invention to provide a method for processing a service and protocol of an American National Standards Institute Transaction Capabilities Application Part (ANSI TCAP) without converting a protocol when a mobile network service type is changed from a service and protocol using an International Telecommunication Union-Telecommunication Standardization Section Transaction Capabilities Application Part (ITU-T TCAP) to a service and protocol using an American National Standards Institute Transaction Capabilities Application Part (ANSI TCAP).

It is another object of the present invention to provide a method for improving the processing performance of a message transfer part (MTP) without converting a protocol even though a mobile network service type is changed while a mobile network system implements a service using an International Telecommunication Union-Telecommunication Standardization Section Transaction Capabilities Application Part (ITU-T TCAP) or an American National Standards Institute Transaction Capabilities Application Part (ANSI TCAP).

To achieve the above and other objects, there is provided a method for processing a service and protocol of a mobile network communication system, including the steps of: checking whether there is a primitive according to a component type upon receiving a primitive from a transaction component (TC) user; if there is a primitive according to the component type, re-constructing a primitive according to the component type; generating a procedure for processing the re-constructed primitive according to a package type, and constructing a primitive to be transmitted to a signal connection control part (SCCP) according to the package type by adding the re-constructed primitive to a component part; checking whether there is a protocol error upon receiving a primitive from the signal connection control part (SCCP); if there is no protocol error and the received primitive is the first primitive generated from the other station, assigning a transaction identification (ID) and recording a receiving status in a corresponding transaction identification (ID) table; and transmitting the received primitive to the transaction component (TC) user.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will now be described with reference to FIGS. 1 to 4B.

Figure 1:
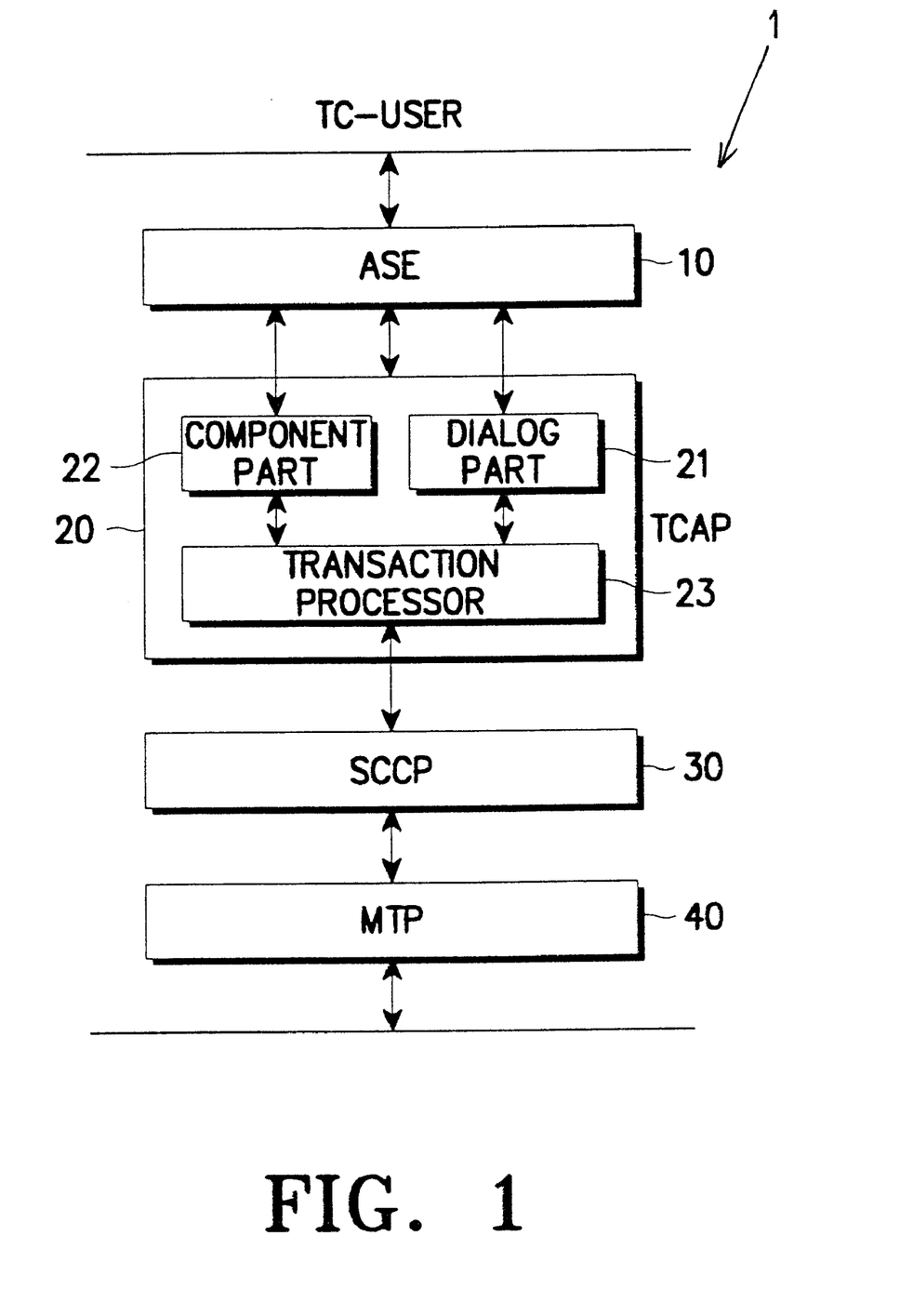
FIG. 1 illustrates a structure of an intelligent network service controller of number 7 (No.7) signaling using an International Telecommunication Union-Telecommunication Standardization Section Transaction Capabilities Application Part (ITU-T TCAP) at a station.
Figure 2:
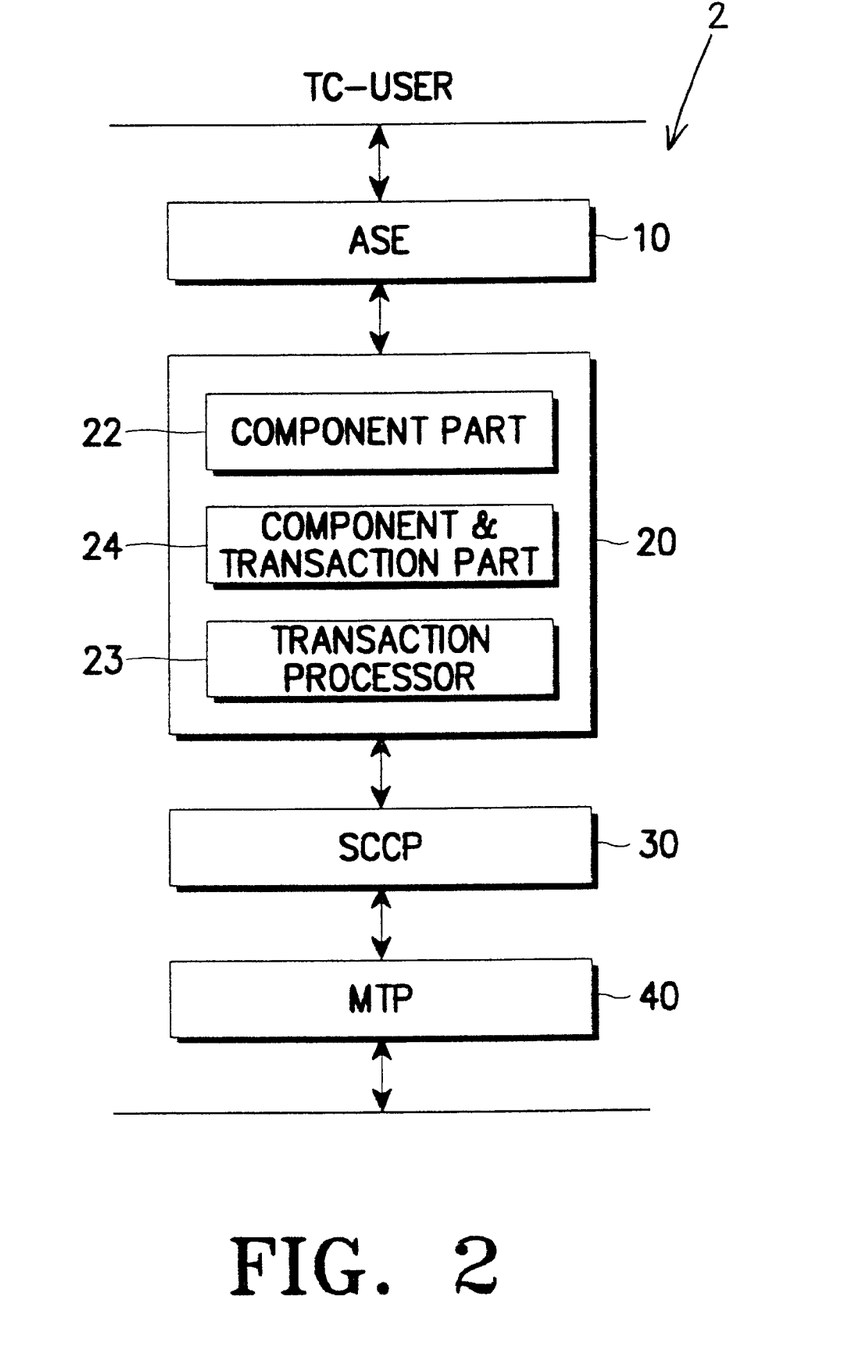
FIG. 2 illustrates a structure of an intelligent network service controller of number 7 (No.7) signaling using an American National Standards Institute Transaction Capabilities Application Part (ANSI TCAP) at a station.

FIGS. 1 and 2 illustrate structures of intelligent network service controllers of number 7 (No. 7) signaling using an International Telecommunication Union-Telecommunication Standardization Section Transaction Capabilities Application Part (ITU-T TCAP) and an American National Standards Institute Transaction Capabilities Application Part (ANSI TCAP), respectively, to which the present invention is applicable.

Referring to FIGS. 1 an 2, the intelligent network service controller, respectively at station 1 and station 2, includes an application service element (ASE) 10 and a protocol processor. The protocol processor has a transaction capabilities application part (TCAP) 20, a signal connection control part (SCCP) 30 and a message transfer part (MTP) 40. Transaction capabilities application part (TCAP) 20 of FIG. 1 includes a dialog part 21, a component part 22 and a transaction processor 23. A transaction capabilities application part (TCAP) 20 of FIG. 2 includes a component part 22, a component and transaction part 24 and as transaction processor 23. The application service element (ASE) 10 generates a corresponding operation by an operation execution request from an application processor and transmits the generated operation to the other application service element (ASE) through the transaction capabilities application part (TCAP) 20. The transaction capabilities application part (TCAP) 20 includes a main processor for managing its position and a transaction identification (ID) table. The transaction capabilities application part (TCAP) 20 is divided into a component sublayer and a transaction sublayer. The component sublayer transmits a component between specific application service elements (ASEs). The transaction sublayer provides a dialog function for transmitting a transaction message.

Referring to FIG. 1, for example, upon receiving a dialog primitive from a dialog execution block of the application service element (ASE) 10, a dialog part 21 receives a component corresponding to the received dialog from a component part 22 and forms a transaction primitive to be transmitted to a transaction processor 23. Upon receiving the transaction primitive, the transaction processor 23 forms a dialog primitive to be transmitted to the dialog part 21 and transmits a component to the component part 22.

Upon receiving a component primitive from an operation execution block of the application service element (ASE) 10, the component part 22 codes a component which is received according to a dialog type and stores the component. Further, the component part 22 transmits a component to the dialog part 21 in response to a request from the dialog part 21 and discards a corresponding component in response to a dialog end message from the dialog part 21.

Upon receiving a component from the dialog part 21, the component part 22 checks if the component has an error and forms a component primitive according to the checked result and a component type to transmit the component primitive to the application service element (ASE) 10.

Upon receiving the transaction primitive from the dialog part 21, the transaction processor 23 forms a transaction message to be transmitted to the signal connection control part (SCCP) 30. Upon receiving a transaction message from the signal connection control part (SCCP) 30, the transaction processor 23 checks if the transaction message has an error and forms a transaction primitive according to the checked result and a component type to transmit the transaction primitive to the dialog part 21. The signal connection control part (SCCP) 30 processes a protocol of number 7 (No. 7) common line signaling by using a service of the message transfer part (MTP) 40. Also, the message transfer part (MTP) 40 transmits and receives a protocol signal through a number 7 (No. 7) link between a service switching point (SSP) and a service control point (SCP).

In the above description, a primitive designates a function message for processing an interface between an adjacent two layers. A component indicates an exchanged protocol data unit. A dialog primitive is a message for processing an interface between the application service element (ASE) 10 and the dialog part 21. A component primitive is a message for processing an interface between the application service element (ASE) 10 and the component part 22. A transaction primitive is a message for processing an interface between the dialog part 21 and the transaction processor 23.

In the switching system for an intelligent network service, a call processing part and a protocol processing part differ according to a service type. That is, there are an International Telecommunication Union-Telecommunication Standardization Section Transaction Capabilities Application Part (ITU-T. TCAP) proposed by International Telecommunicatio[008e] Union-Telecommunication Standardization Section (ITU-T) as shown in FIG. 1 and an American National Standards Institute Transaction Capabilities Application Part (ANSI TCAP) used in the United States (U.S.) as shown in FIG. 2. In code division multiple access (CDMA), the International Telecommunication Union-Telecommunication Standardization Section Transaction Capabilities Application Part (ITU-T TCAP) is used to provide an operation service related to a mobile network. In a mobile communication network using a service and protocol of the American National Standards Institute Transaction Capabilities Application Part (ANSI TCAP), a message transfer part (MTP) of level 3 operates a procedure for converting an International Telecommunication Union-Telecommunication Standardization Section (ITU-T) protocol into an American National Standards Institute (ANSI) protocol to transmit the American National Standards Institute (ANSI) protocol to the other station. During a receiving operation, the message transfer part (MTP) converts the American National Standards Institute (ANSI) protocol into International Telecommunication Union-Telecommunication Standardization Section (ITU-T) protocol to transmit the International Telecommunication Union-Telecommunication Standardization Section (ITU-T) protocol to an upper layer.

As described above, if a mobile network service type is changed to a service and protocol using the American National Standards Institute Transaction Capabilities Application Part (ANSI TCAP) while a mobile communication network system implements an operation related to a mobile network by using a service and protocol of an International Telecommunication Union-Telecommunication Standardization Section Transaction Capabilities Application Part (ITU-T TCAP), the message transfer part (MTP) converts a protocol to perform an operation with the other station. Therefore, the real-time processing performance of the message transfer part (MTP) can be degraded and the capacity capability of a signal terminal which can be connected to the other station can be lowered.

Figure 3:
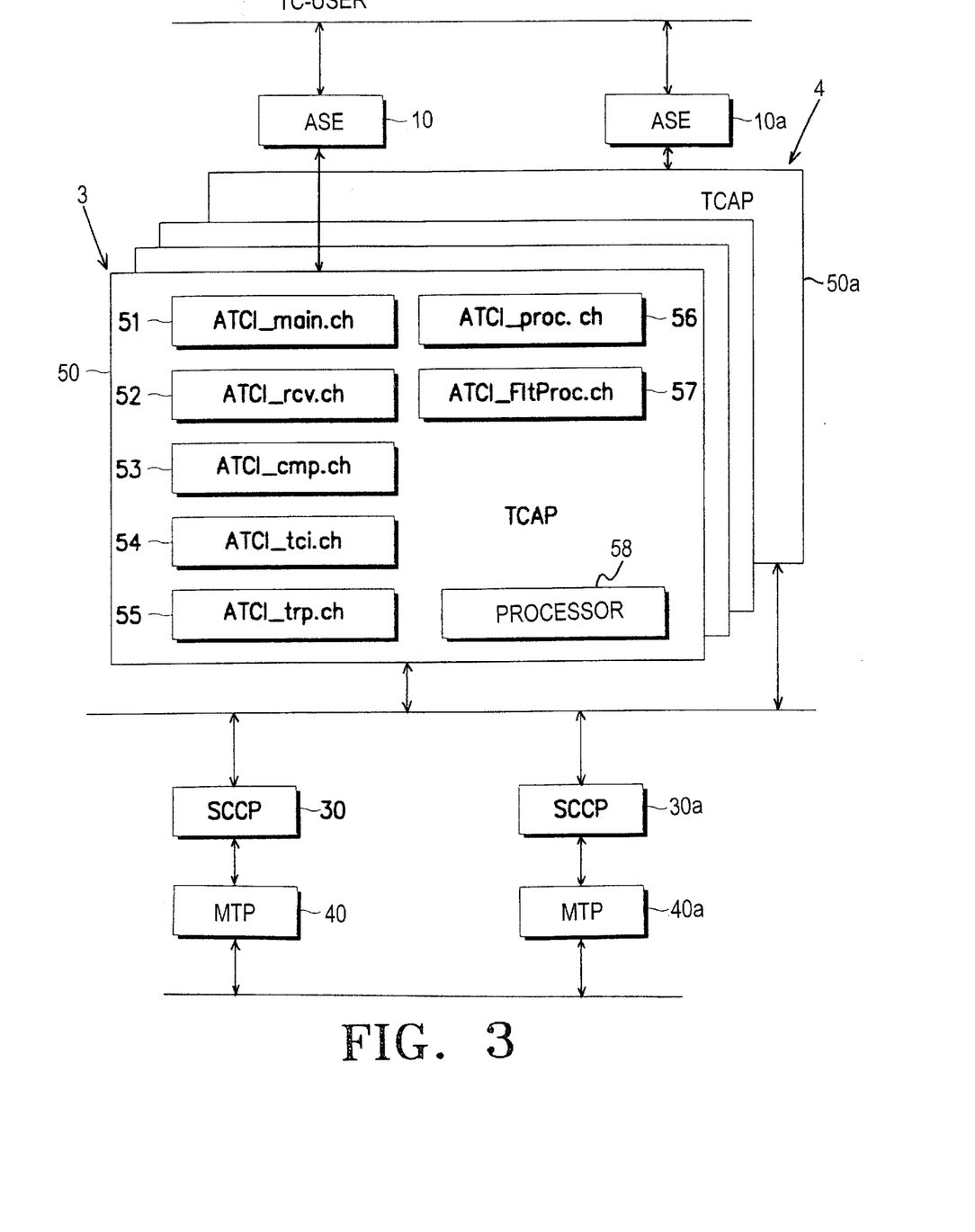
FIG. 3 is a block diagram of a software module of a transaction capabilities application part (TCAP) in an intelligent service controller of number 7 (No.7) signaling according to the present invention at a station and another station having an intelligent service controller.

Referring to FIG. 3, FIG. 3 is a block diagram of a software module of a transaction capabilities application part (TCAP) 50 in an intelligent service controller of number 7 (No.7) signaling according to the present invention, at a station 3. The intelligent service controller of number 7 (No. 7) signaling of FIG. 3, similar to the intelligent service controller of FIGS. 1 and 2, includes an application service element (ASE) 10 and a protocol processor. The protocol processor has a transaction capabilities application part (TCAP) 50, a signal connection control part (SCCP) 30, and a message transfer part (MTP) 40. The application service element (ASE) 10 generates a corresponding operation by an operation execution request from an application processor and transmits the generated operation to another application service element (ASE[00a8] 10a through the transaction capabilities application part (TCAP) 50, for example, application service element (ASE) 10a being similar in construction and function to application service element (ASE) 10. The other application service element (ASE) 10a, such as at station 4, has associated therewith a transaction capabilities application part (TCAP) 50a, which can be similar in construction and function to either a transaction capabilities application part (TCAP) 50 of FIG. 3 or transaction capabilities application part (TCAP) 20 of FIGS. 1 or 2, a signal connection control part (SCCP) 30a, similar in construction and function to signal connection control part (SCCP) 30 of FIGS. 1–3, and a message transfer part (MTP) 40a, similar in construction and function to message transfer part (MTP) 40 of FIGS. 1–3. The transaction capabilities application part (TCAP) 50 of FIG. 3 includes a main processor 58 for managing its position and a transaction identification (ID) table. The transaction capabilities application part (TCAP) 50 includes a component sublayer and a transaction sublayer, with the component sublayer transmitting a component between specific application service elements (ASEs) and the transaction sublayer providing a dialog function for transmitting a transaction message. The signal connection control part (SCCP) 30 processes a protocol of number 7 (No.7) common line signaling with the message transfer part (MTP) 40 transmitting and receiving a protocol signal through number 7 (No.7) link between a service switching point (SSP) and a service control point (SCP).

Continuing with reference to FIG. 3, an ATCI_main.ch block 51 of transaction capabilities application part (TCAP) 50 initializes a table and checks a position of a main processor 58 to transaction capabilities application part (TCAP) 50. An ATCI_rcv.ch block 52 of transaction capabilities application part (TCAP) 50 receives primitives from a transaction component (TC) user and the signal connection control part (SCCP) 30, and processes the received primitives. An ATCI_cmp.ch block 53 of transaction capabilities application part (TCAP) 50 checks whether a component of a primitive is normal and re-constructs a component. An ATCI_tci .ch block 54 of transaction capabilities application part (TCAP) 50 assembles and disassembles a primitive. An ATCI_trp.ch block 55 of transaction capabilities application part (TCAP) 50 checks a primitive received from the signal connection control part (SCCP) 30 and selects an upper transaction component (TC) user. An ATCI_FltProc.ch block 57 of transaction capabilities application part (TCAP) 50 processes an erroneous primitive as an abort primitive. An ATCl_proc .ch block 56 of transaction capabilities application part (TCAP) 50 processes addresses (signal points) of a self station and the other station.

Therefore, the software module of transaction capabilities application part (TCAP) 50 can, for example, provide for processing a service and protocol of an American National Standards Institute Transaction Capabilities Application Part (ANSI TCAP) without converting a protocol when a mobile network service type is changed from a service and protocol using an International Telecommunication Union-Telecommunication Standardization Section Transaction Capabilities Application Part (ITU-T TCAP) to service and protocol using American National Standards Institute Transaction Capabilities Application Part (ANSI TCAP). Also, transaction capabilities application part (TCAP) 50 provides for improving the processing performance of a message transfer part (MTP), such as message transfer part (MTP) 40, without converting a protocol even though a mobile network service type is changed while a mobile network system implements a service using an International Telecommunication Union-Telecommunication Standardization Section Transaction Capabilities Application Part (ITU-T TCAP) or an American National Standards Institute Transaction Capabilities Application Part (ANSI TCAP).

Figure 4A:
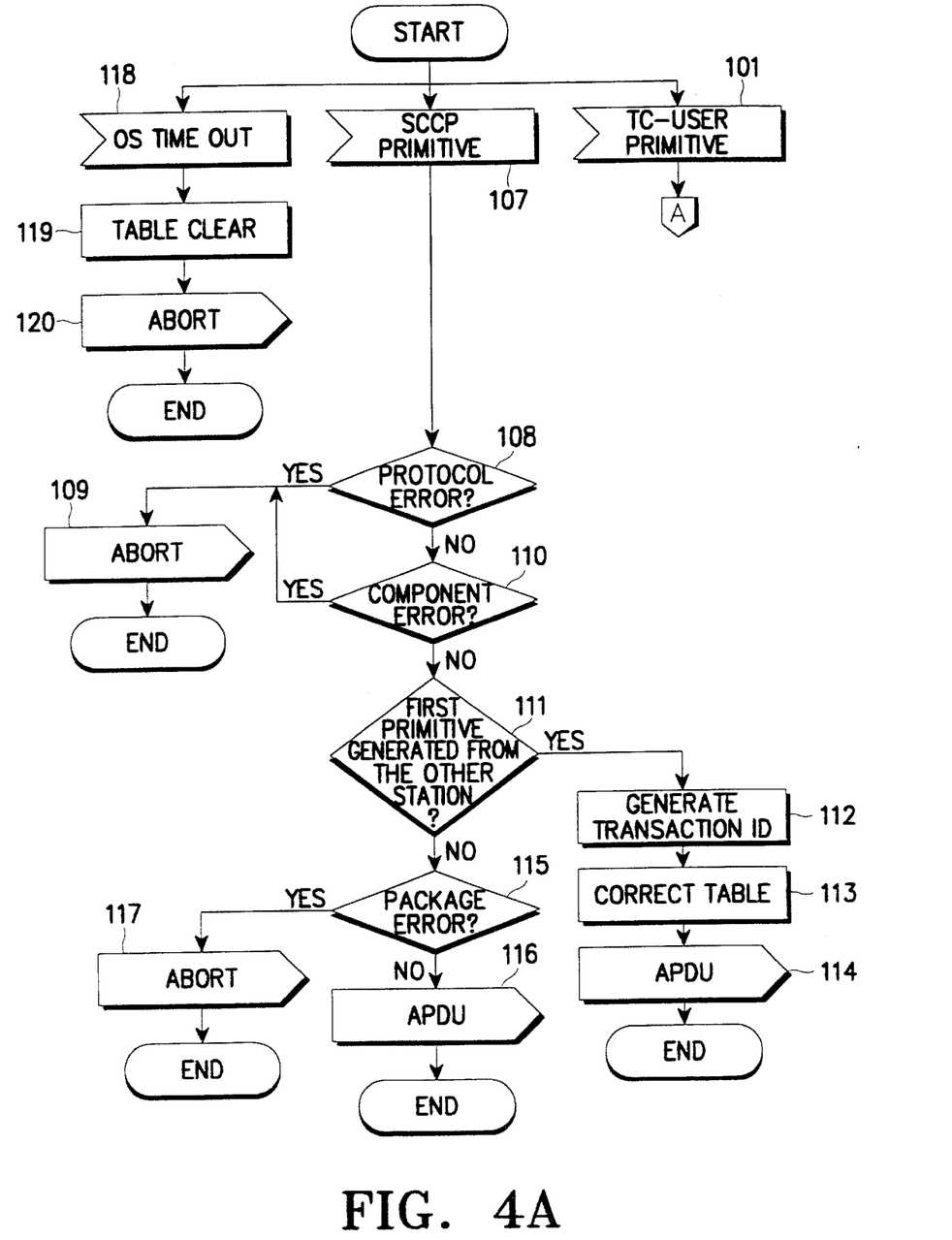
FIGS. 4A and 4B are flow charts for processing a service and protocol of an American National Standards Institute Transaction Capabilities Application Part (ANSI TCAP) according to the present invention.
Figure 4B:
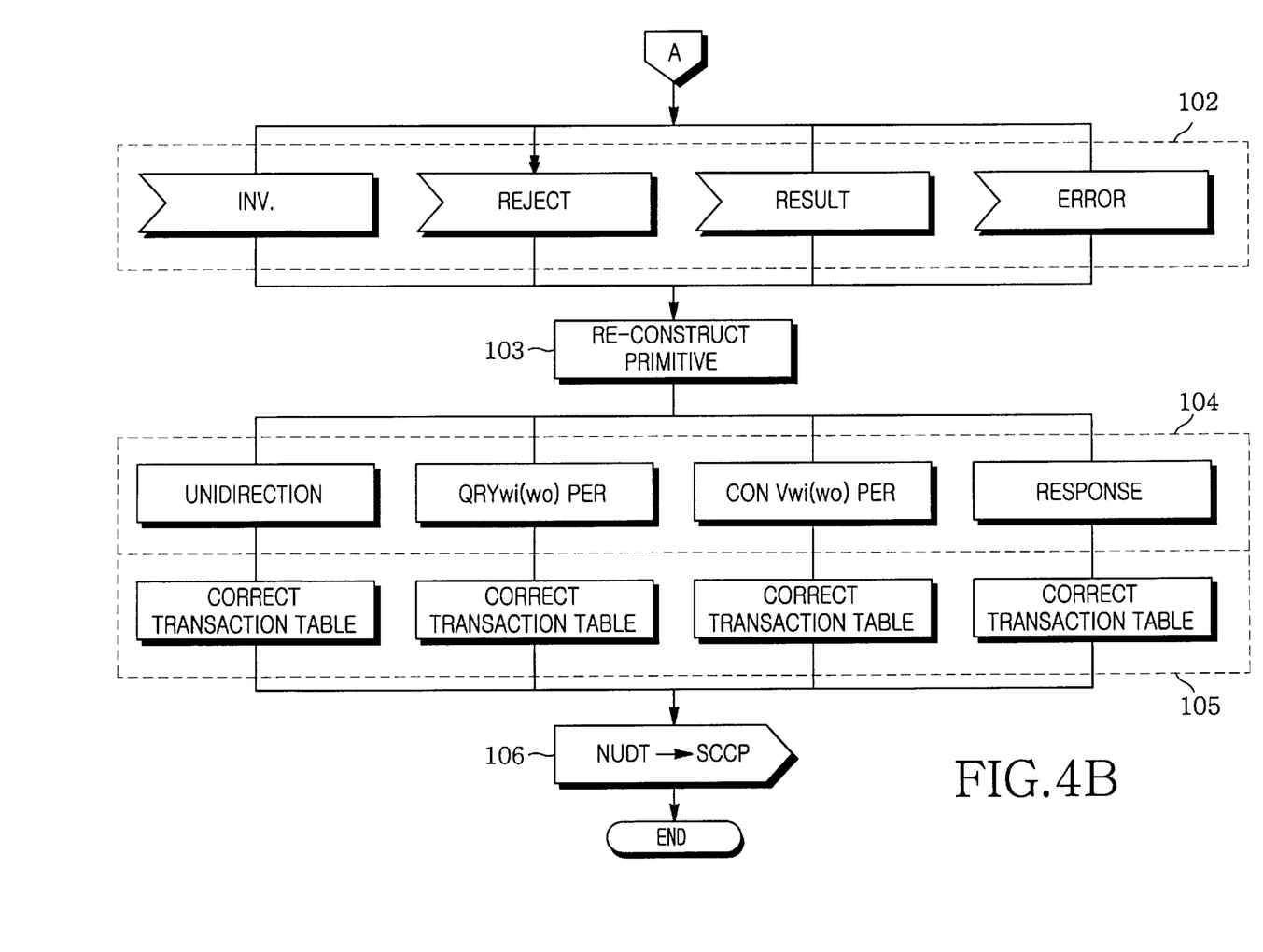

Referring to now FIGS. 4A and 4B, FIGS. 4A and 4B are flow charts for illustrating processing a service and a protocol of an American National Standards Institute Transaction Capabilities Application Part (ANSI TCAP) utilizing the software module of transaction capabilities application part (TCAP) 50 in the intelligent network service controller of FIG. 3, for example, for processing such service and such protocol according to the following steps. Upon receiving a primitive from an upper transaction component (TC) user at step 101, it is checked at step 102 whether there is a primitive according to a component type. As a component type, there are invoke (INV.), reject, result and error components. At step 103, a primitive varying with the component type is re-constructed to generate a procedure for processing the primitive according to a package type. At step 104, primitives, such as unidirection, query with (without) permission QRYwi(wo)PER, conversation with (without) permission CONVwi(wo)PER, and response primitives, are constructed by adding a primitive to the component part, in order to transmit the primitive according to the package type to the signal connection control part (SCCP) 30. Before a final primitive is transmitted to the signal connection control part (SCCP) 30, a transmitting status is recorded according to a primitive type in a table managed internally with a transaction identification (ID) generated from an upper layer at step 105, step 105 including correct transaction table. At step 106, a[008e] N-unidata (NUDT) primitive is transmitted to the signal connection control part (SCCP) 30 and a time which should end an operation of a corresponding primitive is registered in an operation system (OS).

Continuing with reference to FIGS. 3, 4A and 4B, upon receiving a primitive from the signal connection control part (SCCP) 30 at step 107, it is checked at step 108 whether the received primitive has a protocol error. If there is a syntax error, an abort primitive is transmitted to the application service element (ASE) 10 or 10a at step 109. If there is no error in a protocol of the received primitive, it is checked at step 110 whether the received primitive has a component error. If so, step 109 is executed, and if not, it is checked at step 111 whether the received primitive is the first primitive generated from the other station. If so, a transaction identification (ID) for managing a self station is generated at step 112 and a receiving status is recorded in a corresponding transaction identification (ID) table at step 113. An application data unit (APDU) primitive is transmitted to the transaction component (TC) user at step 114. If the received primitive is not the first primitive generated from the other station, that is, if it is a response to a primitive generated from a self station at step 111, it is checked at step 115 whether there is a package error. If no package error is detected, an application data unit (APDU) primitive is transmitted to the transaction component (TC) user at step 116. If there is a package error, an abort primitive is transmitted to the other station at step 117.

Meanwhile, again referring to FIGS. 3, 4A and 4B if there is no execution result from the other station within the time registered in the operation system (OS), the operation system (OS) generates a time-out message with respect to a corresponding primitive at step 118. A table corresponding to a transaction identification (ID) of the primitive is cleared at step 119. An abort primitive is then transmitted to the transaction component (TC) user at step 120.

Thus, even if a mobile network service type is changed to a service and protocol using an American National Standards Institute Transaction Capabilities Application Part (ANSI TCAP) while a mobile network system implements a service and protocol using an International Telecommunication Union-Telecommunication Standardization Section Transaction Capabilities Application (ITU-T TCAP), the message transfer part (MTP) can process the service and protocol using the American National Standards Institute Transaction Capabilities Application Part (ANSI TCAP) without converting the protocol. Therefore, the real-time processing performance of the message transfer part (MTP) can be improved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not to be limited to the particular embodiments disclosed as the best mode contemplated for carrying out the present invention, but that the present invention includes all embodiments falling within the scope of the appended claims.

What is claimed is:

1. A method for processing a service and protocol of a mobile network communication system, comprising the steps of:
   providing an application service element (ASE) connected to a transaction component (TC) user, said application service element (ASE) for generating a corresponding operation by an operation execution request from an application processor and transmitting the generated operation to another application service element (ASE);
   providing a transaction capabilities application part (TCAP) which is connected to said application service element (ASE), said transaction capabilities application part (TCAP) including a main processor and a transaction identification (ID) table, said transaction capabilities application part (TCAP) being divided into a component sublayer for transmitting a component between application service elements (ASEs) and a transaction sublayer for providing a dialog function for transmitting a transaction message;
   providing a message transfer part (MTP) for transmitting and receiving a protocol signal through a number 7 (No.7) link;
   providing a signal connection control part (SCCP) connected to said transaction capabilities application part (TCAP), said signal connection control part (SCCP) for transmitting information by using a protocol of number 7 (No.7) common line signaling;
   checking whether there is a primitive according to a component type upon receiving a primitive from said transaction component (TC) user;
   if there is a primitive according to the component type, re-constructing a primitive according to the component type;
   generating a procedure for processing the re-constructed primitive according to a package type;
   constructing a primitive to be transmitted to said signal connection control part (SCCP) according to the package type by adding the re-constructed primitive to a component part;
   checking whether there is a protocol error upon receiving a primitive from said signal connection control part (SCCP);
   if there is no protocol error and the received primitive is the first primitive generated from another station, assigning a transaction identification (ID) and recording a receiving status in a corresponding transaction identification (ID) table; and
   transmitting the primitive received from said signal connection control part (SCCP) to said transaction component (TC) user, if there is no protocol error.

2. The method according to claim 1, wherein an N-unidata (NUDT) primitive is transmitted to said signal connection control part (SCCP).

3. The method according to claim 1, wherein an application data unit (ADPU) primitive is transmitted to said transaction component (TC) user.

4. The method according to claim 3, wherein an N-unidata (NUDT) primitive is transmitted to said signal connection control part (SCCP).

5. The method according to claim 4, further comprising the step of, if there is said protocol error, transmitting an abort primitive to said another station.

6. The method according to claim 1, further comprising the step of, if there is no execution result from said another station within a predetermined time, transmitting an abort primitive to said transaction component (TC) user.

7. The method according to claim 6, further comprising the step of, if there is said protocol error, transmitting an abort primitive to said another station.

8. The method according to claim 7, wherein an N-unidata (NUDT) primitive is transmitted to said signal connection control part (SCCP) and wherein an application data unit (ADPU) primitive is transmitted to said transaction component (TC) user.

9. An apparatus for processing a service and protocol of a mobile network communication system, comprising:
   an application service element (ASE) connected to a transaction component (TC) user, said application service element (ASE) for generating a corresponding operation by an operation execution request from an application processor and transmitting the generated operation to another application service element (ASE);
   a transaction capabilities application part (TCAP) which is connected to said application service element (ASE), said transaction capabilities application part (TCAP) including a main processor and a transaction identification (ID) table, said transaction capabilities application part (TCAP) being divided into a component sublayer for transmitting a component between application service elements (ASEs) and a transaction sublayer for providing a dialog function for transmitting a transaction message, said transaction capabilities application part (TCAP) for checking whether there is a primitive according to a component type upon receiving a primitive from said transaction component (TC) user, if there is a primitive according to the component type, for re-constructing a primitive according to the component type, for generating a procedure for processing the re-constructed primitive according to a package type, for constructing a primitive to be transmitted to a signal connection control part (SCCP) according to the package type by adding a re-constructed primitive to a component part, for checking whether there is a protocol error upon receiving a primitive from a signal connection control part (SCCP), if there is no protocol error and the received primitive is the first primitive generated from another station, for assigning a transaction identification (ID) and for recording a receiving status in a corresponding transaction identification (ID) table, and for transmitting a received primitive to said transaction component (TC) user;
   a message transfer part (MTP) for transmitting and receiving a protocol signal through a number 7 (No.7) link; and
   a signal connection control part (SCCP) connected to said transaction capabilities application part (TCAP), said signal connection control part (SCCP) for transmitting information by using a protocol of number 7 (No.7) common line signaling.

10. The apparatus according to claim 9, wherein an N-unidata (NUDT) primitive is transmitted to said signal connection control part (SCCP).

11. The apparatus according to claim 9, wherein an application data unit (ADPU) primitive is transmitted to said transaction component (TC) user.

12. The apparatus according to claim 11, wherein an N-unidata (NUDT) primitive is transmitted to said signal connection control part (SCCP).

13. The apparatus according to claim 12, wherein if there is said protocol error, an abort primitive is transmitted to said another station.

14. The apparatus according to claim 13, wherein if there is no execution result from said another station within a predetermined time, an abort primitive is transmitted to said transaction component (TC) user.

15. The apparatus according to claim 9, wherein if there is said protocol error, an abort primitive is transmitted to said another station.

16. The apparatus according to claim 9, wherein if there is no execution result from said another station within a predetermined time, an abort primitive is transmitted to said transaction component (TC) user.

17. The apparatus according to claim 16, wherein if there is said protocol error, an abort primitive is transmitted to said another station.

18. The apparatus according to claim 9, wherein said transaction capabilities application part (TCAP) further includes a block for initializing a table and for checking a position of a main processor, a block for receiving a primitive from at least one of said transaction component (TC) user and said signal connection control part (SCCP) and for processing a received primitive, a block for determining whether a component of a primitive is normal and for reconstructing a component, a block for assembling and disassembling a primitive, a block for checking a received primitive from said signal connection control part (SCCP) and for selecting a transaction component (TC) user, a block for processing an erroneous primitive as an abort primitive, and a block for processing at least one address of at least one station.

* * * * *